United States Patent [19]
Mick et al.

[11] 3,988,533
[45] Oct. 26, 1976

[54] VIDEO-TYPE UNIVERSAL MOTION AND INTRUSION DETECTION SYSTEM

[75] Inventors: Peter Mick, East Orange; Donald Beck, Boonton, both of N.J.

[73] Assignee: Video Tek, Inc., Mountain Lakes, N.J.

[22] Filed: Sept. 30, 1974

[21] Appl. No.: 510,627

[52] U.S. Cl. .......................... 178/6.8; 340/324 AD
[51] Int. Cl.² ........................................ H04N 7/18
[58] Field of Search ...................... 178/DIG. 33, 6.8

[56] References Cited
UNITED STATES PATENTS

| | | | |
|---|---|---|---|
| 3,590,151 | 6/1971 | Keith | 178/6.8 |
| 3,740,466 | 6/1973 | Marshall | 178/6.8 |
| 3,743,768 | 7/1973 | Copland | 178/DIG. 33 |
| 3,816,648 | 6/1974 | Noll | 178/DIG. 33 |
| 3,836,710 | 9/1974 | Takahashi | 178/DIG. 33 |

*Primary Examiner*—Howard W. Britton
*Attorney, Agent, or Firm*—Flynn & Frishauf

[57] ABSTRACT

A motion and intrusion detection system utilizing video techniques samples fixed points during a video scan of the field of view of a camera and stores information concerning the fixed scanned points. During subsequent scans, information concerning the respective scanned points is compared with previous scans and threshold conditions are set up in order to detect an alarm condition. Further, apparatus is provided to change the field of view of the video system and in order to automatically focus and zoom in to magnify a particular portion of the field of view. Still further, means is provided to display a "map" of the alarmed areas on the screen of the television monitor.

26 Claims, 25 Drawing Figures

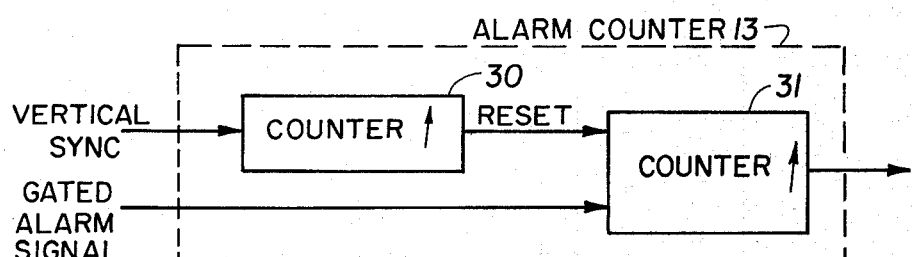
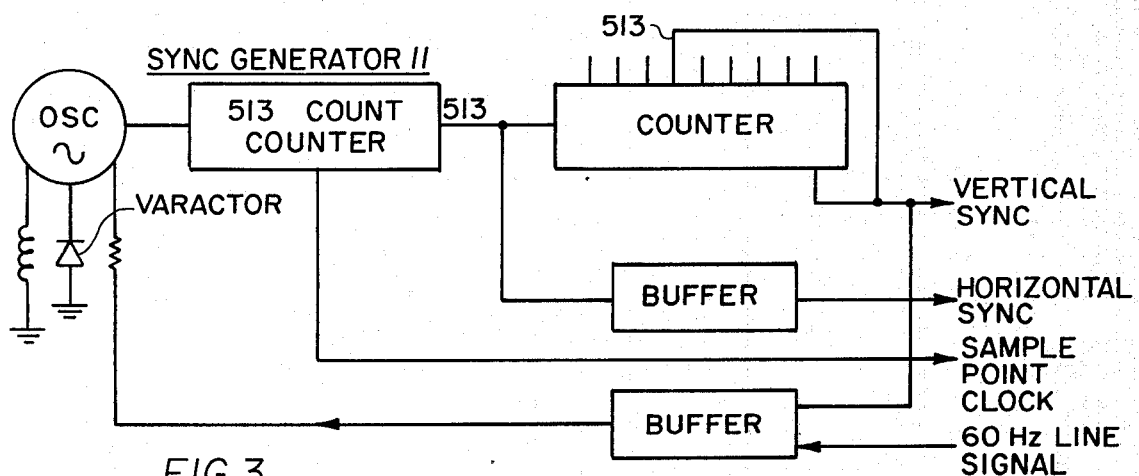
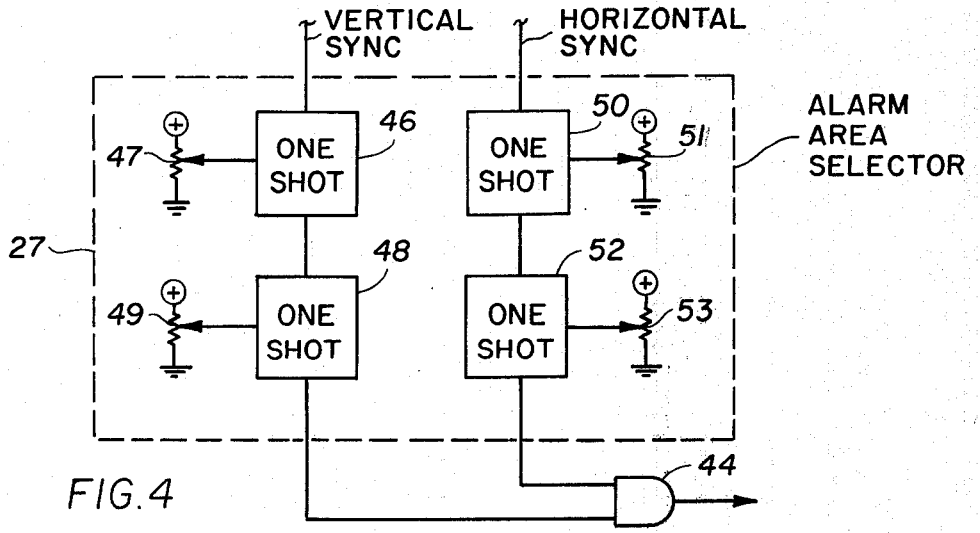
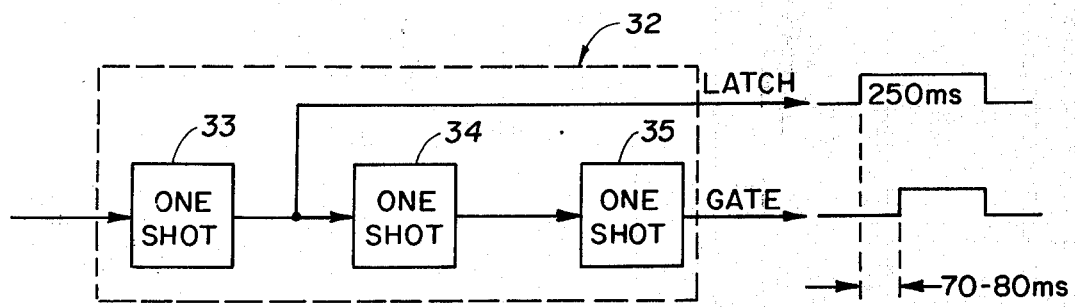

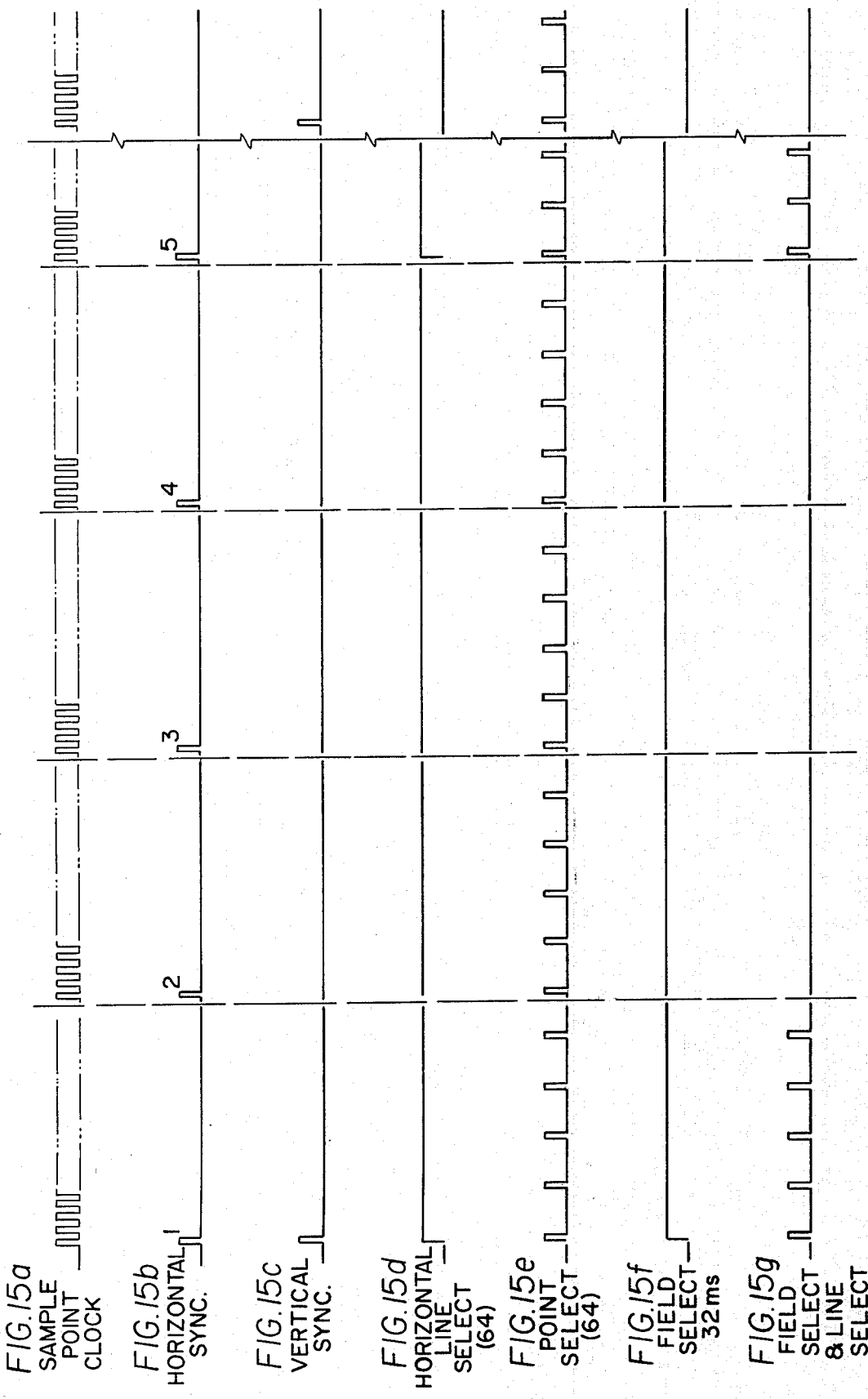

VIDEO-TYPE UNIVERSAL MOTION AND INTRUSION DETECTION SYSTEM

The present invention relates to a universal motion and intrusion detection system, and more particularly to a method and apparatus for utilizing a video camera and associated circuitry to detect motion in a given field of view and to sound an alarm when such motion is detected and/or to focus attention on the motion.

While the present invention is described herein with reference to a surveillance system, it should be clear that the invention is applicable to any other type of video or television system wherein it is desired to detect motion, changes in grey scale, changes of position or intrusion in a given field of view of a video camera, and to sound an alarm and/or focus on the motion and follow the motion. Moreover, while the invention is described with respect to a conventional type of video camera, the techniques are equally compatible with low-light level infrared as well as the visible spectrum. There is no limitation as to the type of photosensor used in the system.

Several video surveillance techniques are generally known, as exemplified, for example, by U.S. Pat. Nos. 3,590,151 and 3,740,466, both of which are assigned to Jackson and Church Electronics Co., Inc. The video detection systems presently available, including the systems described in the above two U.S. patents employ video averaging techniques which gives them a certain inherent minimum threshold of sensitivity. This characteristic does not allow the prior art systems to be used for detecting all forms of motion. The video averaging motion detectors consider a certain area of an alarm site and on an analog basis integrates and stores the video waveform. The prior art systems then re-scan the area on the next field or the next frame, re-compute the average and look for differences in this average value. Due to circuit noise and the quality of the analog processing and frame-to-frame drifts in the circuitry, the resulting system has a minimum sensitivity which render them unsuitable for reliable detection of certain types of motion.

The main object of the present invention is to provide a more sensitive and accurate motion and intrusion detection system than as presently known in the art. More particularly, an object of the present invention is to provide a system which does not use the video averaging techniques, generally used in the art, in determining motion and/or intrusion in a given field of view.

Another object of the present invention is to provide such a system which is capable of focusing on the motion in the given field of view, mapping it and/or zooming in on the motion and tracking same.

A further object of the invention is to provide a system in which only a portion of the field of view of the video camera can be easily selected for detection of alarm conditions only in the selected portion of the field of view. This can be accomplished by means of a "light pen" or the like.

A still further object of the present invention is to provide a digital system which is substantially drift-free, thereby eliminating need for frequent adjustment, and further allowing repeatable digital thresholds to be set with regard to intruder size, intruder motion and intruder gray scale.

A still further object of the present invention is to provide a system which accurately pin points the motion and which further describes the nature of the motion.

A further object of the present invention is to provide a system which is less prone to generating false alarms. More particularly, an object of the present invention is to prevent false alarm generation from certain forms of motion that are not intrusions, such as snow, rain, wind vibration and, for example, tree and other wind-generated motion when the alarm site is out of doors.

A still further object of the present invention is to provide a system which can discriminate an alarm condition further based on the size and speed of the intrusion.

SUMMARY OF THE INVENTION

According to the present invention, a motion and intrusion detection system comprises a video camera for viewing a given field of view and for generating video signals corresponding to the field of view. The video signals are then converted into a plurality of coded digital signals which correspond to the grey level of the video signal at a plurality of points in the field of view of the camera, and the coded digital signals are stored in a main storage device. The coded information corresponding to the plurality of points from a first scan of the video camera is compared with coded information corresponding to the same plurality of points generated during a subsequent scan of the video camera on a point-by-point basis. Means is provided for generating an alarm signal when the difference between the compared signals for corresponding points exceeds a predetermined value, and an alarm indication means indicate the detection of an alarm condition.

BRIEF DESCRIPTION OF THE DRAWINGS

FIG. 2 illustrates the alarm analyzer of the present invention in greater detail;

FIG. 3 illustrates the sync generator of the present invention in greater detail;

FIG. 4 illustrates the alarm area selector of the present invention in greater detail;

FIG. 5 illustrates the pulse generator 32 of the present invention in greater detail;

FIGS. 15a–15g show a waveform diagram at indicated points in FIG. 1; and

DETAILED DESCRIPTION OF ILLUSTRATED EMBODIMENTS

Figure 1A:
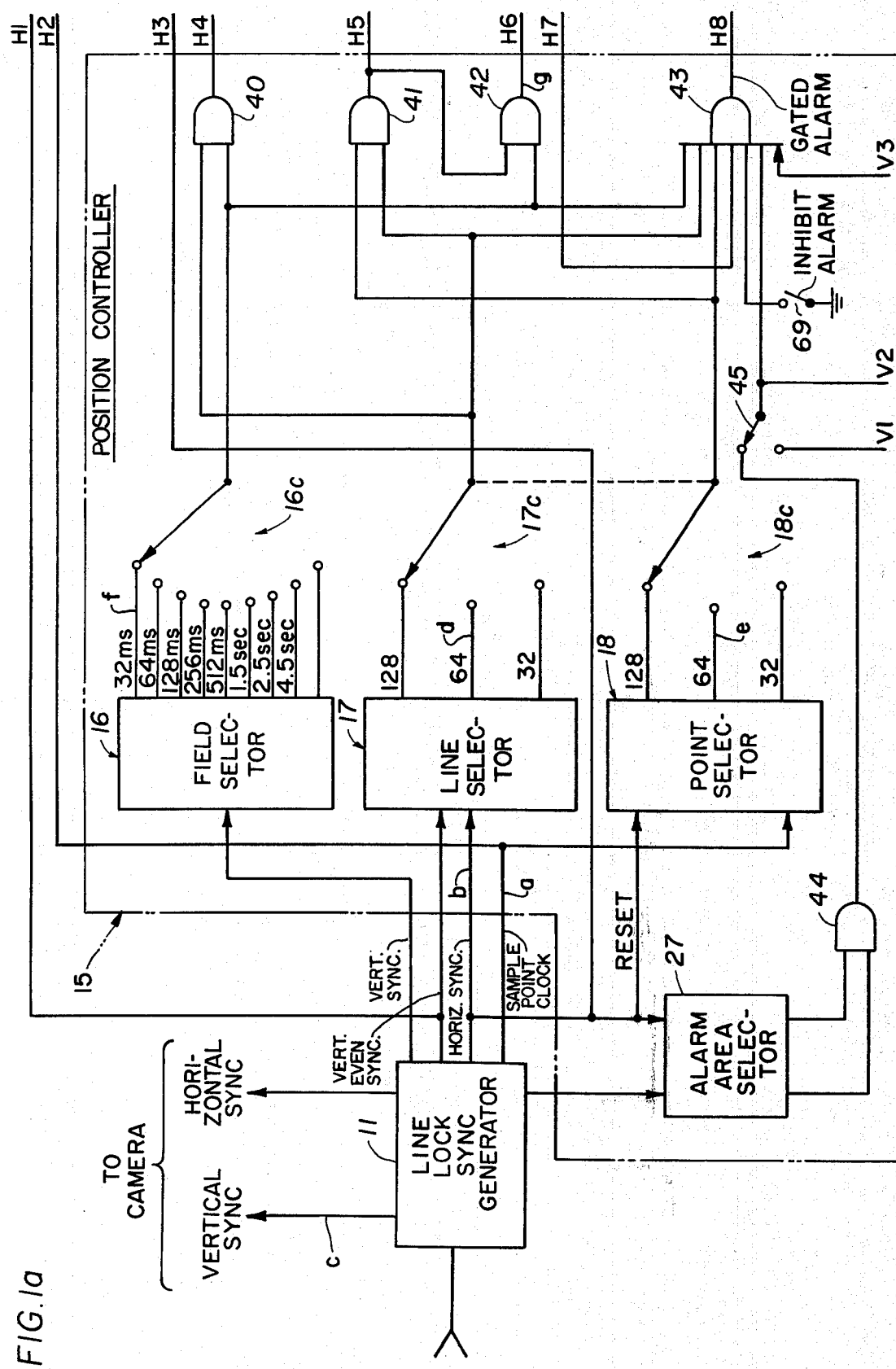
FIGS. 1a–1d show a basic block diagram of an embodiment of the present invention.
Figure 1B:
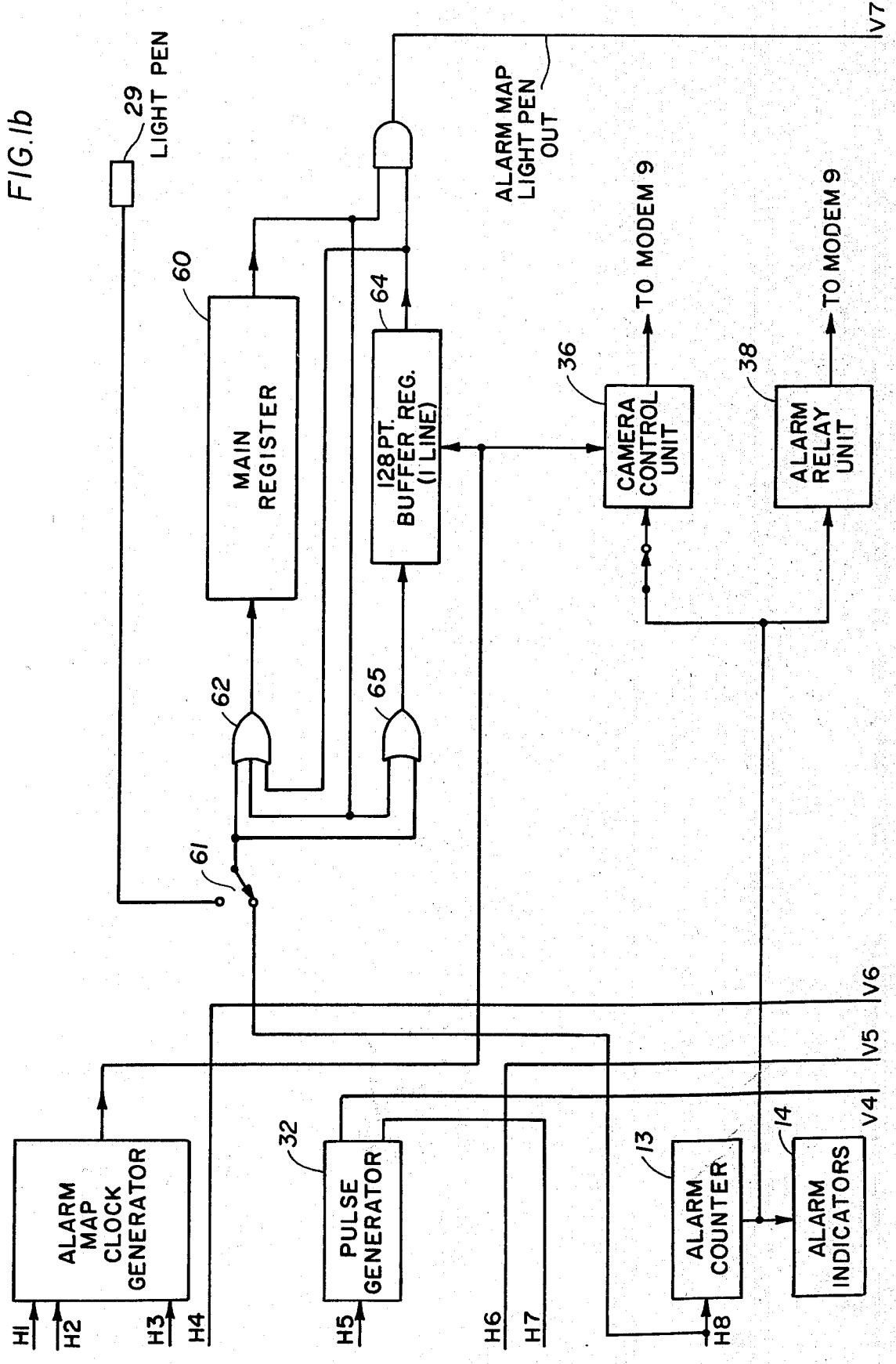
Figure 1C:
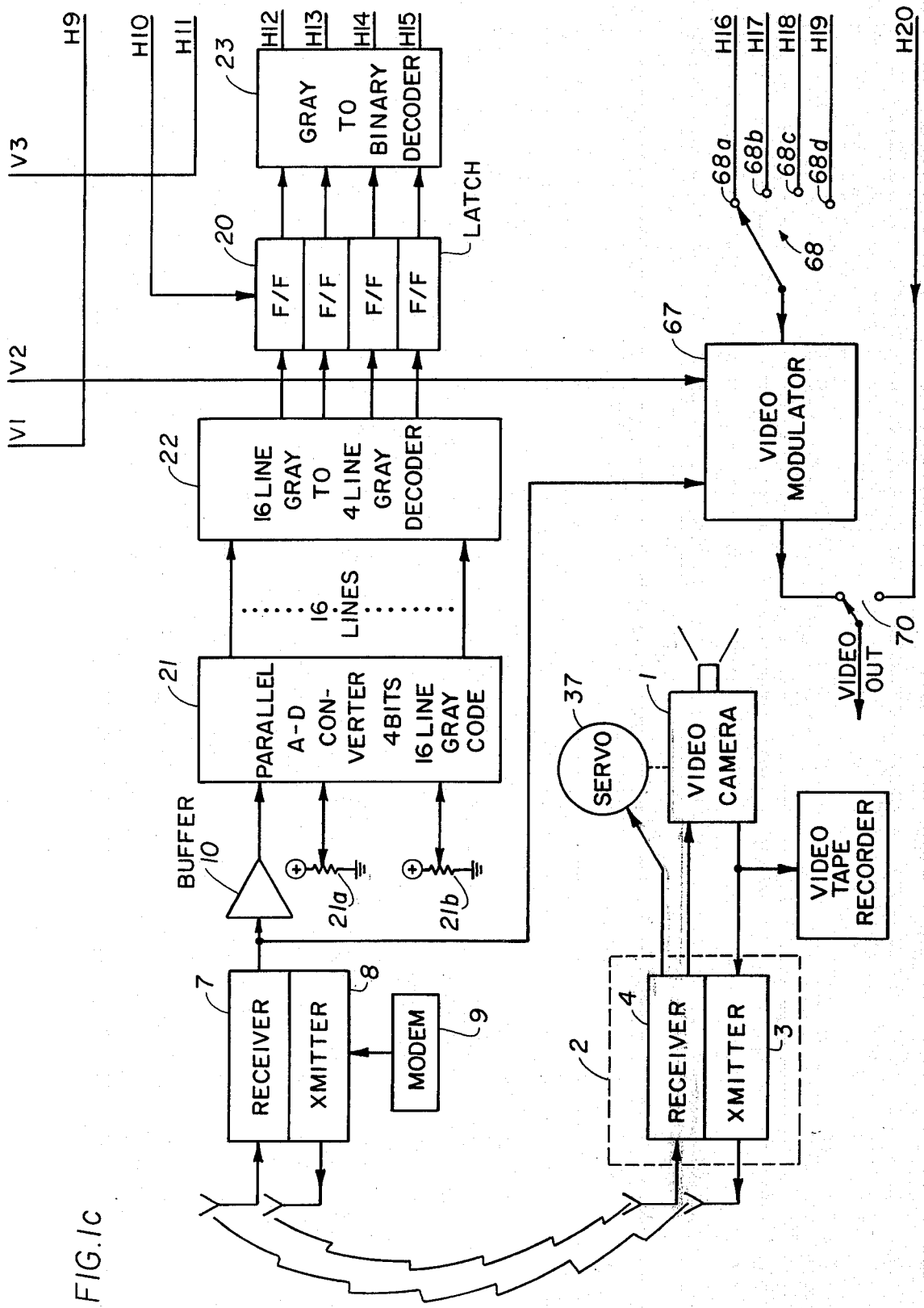
Figure 1D:
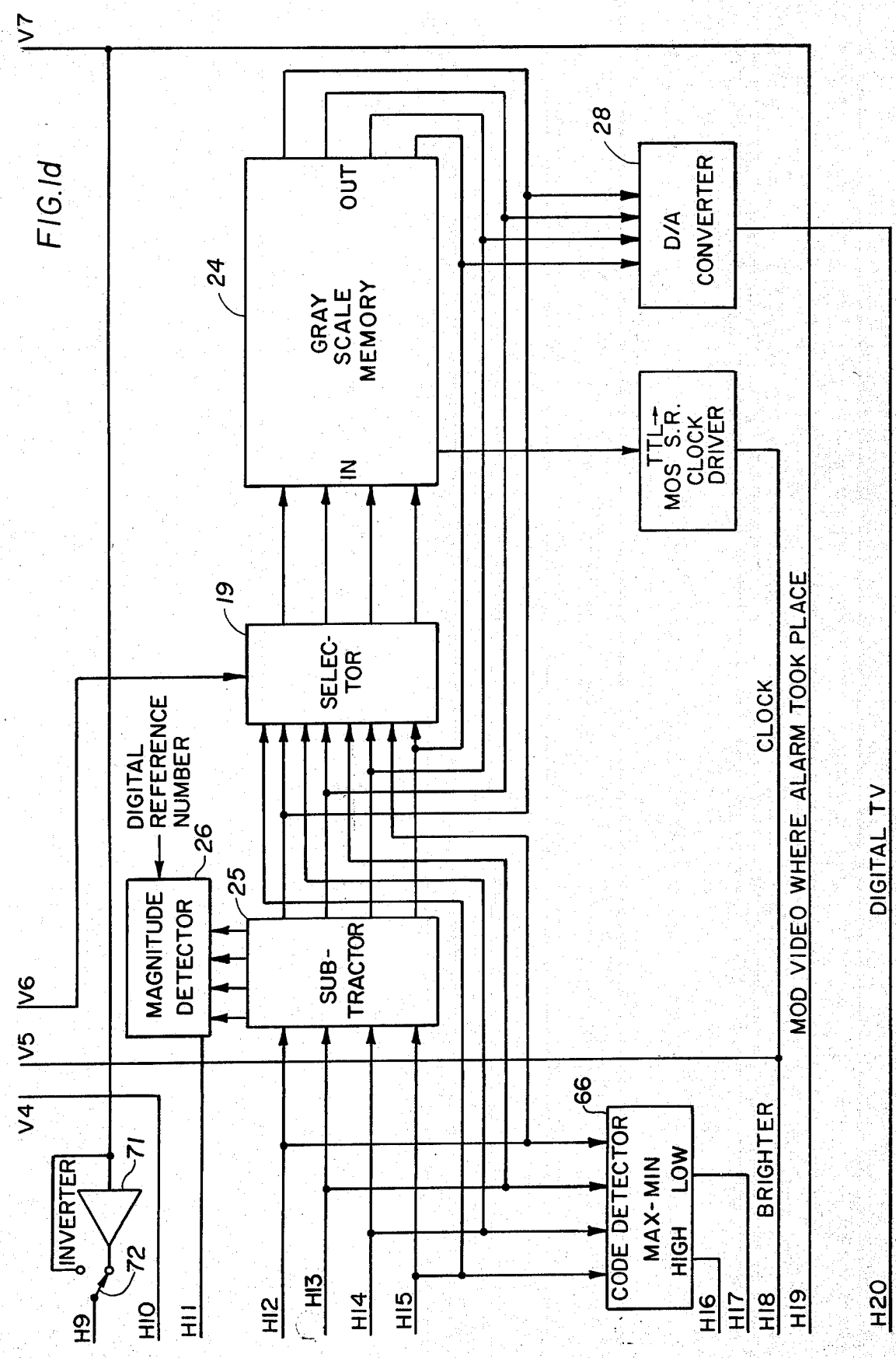

Before discussing the invention in detail, a discussion of the general principles of operation of the detection system of the present invention is given below.

In accordance with the present invention, specific points in time are monitored on a video waveform which represent a given video field. A pattern of sample points is generated on the given video field. The video field used in this specific embodiment comprises commercial television rate frequencies modified to present 256.5 lines per field or a total of 513 lines per frame. This includes the lines generated during vertical retrace. The sample points are taken on every line of the field, there being 128 sample points per line. The numbers used herein are only by way of example, and can be increased or decreased in accordance with the particular application. The pattern of the sample points on a line-to-line basis is continually shifting in a preprogramed format. The total number of points being sampled in a given field in the illustrated embodiment is 16,384. Each one of the sample points consists of a period of time that is approximately 20 nanoseconds duration. Since a horizontal sweep at T.V. frequencies consists of 63.5 microseconds, the percentage sample time represents less than 0.0315 percent of the sweep time if it is further considered that the bandwidth of the video camera is on the order of 4 megacycles. Thus, the sampling duration is on the same order of magnitude as the video resolution. It has been found that there is no advantage or improvement in sensitivity by reducing the sample period further than 20 nanoseconds. This sample point is carefully ear-marked in time by the coordinates of a synchronous vertical counter which counts horizontal sweeps and its position horizontally is defined by a precision oscillator synchronized on a submultiple of the horizontal frequency which counts the position of the sample point on the horizontal sweep line. This coordinate information is known because of the synchronous generation of vertical sync, horizontal sync and sample points. Therefore, every point is referenced to the vertical even sync which is the top left of the field of view. The sample point level which represents gray scale information of the sample point is quantized by an analog-to-digital converter (A/D converter) which provides, for example, 16 levels of quantization or 4 bits. The levels of quantization may be varied depending upon system requirements. The A/D converter necessarily has to be extremely fast and therefore is a full parallel A/D converter (Grey code).

The gray scale information for the sample point and its coordinates are stored and then on the subsequent field of the same type (odd or even), the same scan position is located by monitoring the vertical position counter and the horizontal position counter until the same coordinates reoccur and again a 20 nanosecond sample of the video is taken. The subsequent sample is processed through the same 4 bit parallel A/D converter. This new sample is compared with the previously stored sample on a numerical basis. The quantization process involves converting the analog signal into a Grey coded binary signal, which allows for differences to be observed while avoiding ambiguities, at the threshold points between levels. The two stored values are then converted into a binary number and subtracted from each other. If a difference exceeding, for example, plus or minus 2 is observed, an alarm condition exists. The alarm condition which does not necessarily institute an alarm condition external to the equipment, contains three important characteristics. The time of the alarm, the magnitude of the alarm, and the exact location of the alarm (since it relates to a particular sample point). This information is available as three digital words. With this stored information, the scanning process and the monitoring of the 16,384 alarm points continues, and if another sample point indicates a change in level, several decisions can be made based on the following criteria.

1. The time difference between the alarms in conjunction with the distance of the two alarm sample points, gives a measure of the intrusion velocity. The process of measuring velocity is a continuous one and covers many points. It must be recognized that this process is occurring very rapidly since the time between fields is approximately 32 milliseconds. This means that 30 alarms can occur within a period of one second, for a small high speed intrusion (i.e., intruder size on the order of the size of a sample point).

2. The number of alarms that occur within one field gives an indication of the size of the intrusion when related to the camera's field of view.

As the alarms occur, a recording device such as a video tape recorder may be instantly started to record the entire intrusion interval until it is automatically or manually stopped. In addition, the digital words providing X and Y coordinates of the sampled point in the monitored site, and the intensity (i.e. Grey scale) are stored and identified in a fashion that indicates the location and Grey scale within the frame in which the alarm took place. It is this digital information that provides the basis for an alarm map which may be displayed on a monitor.

The mapping can be done without XY coordinates because, in the illustrated embodiment, when a point is alarmed it is entered into a point memory (16,384 bits) which is synchronously clocked with the sample point generator clock.

The digital XY information identifies the location of the intrusion relative to the camera's field of view. In other words, the field of view could be considered as being centered at the origin of a Cartesian Coordinate System and the digital alarm location, which is, for example, an eight bit binary number, in both X and Y, provides information as to where the motion occurred. Therefore, by using these coordinates the camera can be remotely directed by a servo mechanism to re-center the origin of the camera's coordinate system at the point where motion occurred. From the size estimates, gathered by the differences in X and Y addresses occurring in one given field, information can be gathered as to the magnification required to fill the camera's field of view with the motion. For example, if alarms were such that in one field that the greatest difference in X coordinates and Y coordinates was the binary number 26, the camera could be instructed to increase its magnification by a factor of 10. This digital difference signal would be provided to a motor-controlled zoom lens via, for example, a radio link. The largest difference in coordinates would determine the maximum allowable degree of magnification.

The detector generally performs a point analysis of 16,384 points periodically and provides numerical data to the subsequent digital processing circuitry to evaluate the nature of the alarm. The circuitry for detecting and analyzing and quantizing the video signal, may be provided only in a central station, allowing all the central processing hardware to be common to all sites. This allows a minimum of hardware at the remote monitored sites.

Referring to FIG. 1, a video camera 1 is provided to "observe" a given field of view, hereinafter referred to as the "monitored site". The video camera is provided with a transceiver 2, which may suitably be a low power transceiver. The transmitter portion of the transceiver 2 transmits the video information from the camera to a central station 5. The receiver portion of the transceiver 2 receives positioning information which is used at the "monitored site" to vary the position of the video camera 1 and/or to operate the zoom lens system thereof. When a plurality of remote cameras are used, it is necessary for the transceiver to have decoding equipment so as to be able to differentiate the information intended for a particular remote site from information pertaining to other remote sites. Also, if desired, means can be provided at the remote sites so as to be responsive to general information received from the central station to verify "normal" operation of the electronics at the remote site.

The video transmitter 3 at transceiver 2 amplitude modulates the video signal with approximately a 6 megacycle base band response and transmits it at, for example, UHF frequencies back to the central station 5. If the frequency is sufficiently high, the transmitted beam width can be very narrow and directed at the central station antennas. For beam widths of approximately 2.10 of a st radiant, 10 millowatts of RF will provide 2 mile range with sufficient signal-to-noise ratio. Higher powers may be used as desired. The video transmitter 3 runs on a continuous basis providing video information to the central station 5 for analysis. Video transmitters 3 from different remote sites are frequency multiplexed, thereby allowing the central station 5 to identify the source of transmission.

The receiver 4 receives coordinate information for the purpose of positioning to the camera in digital form as well as digital messages indicating the degree of magnification that is required. In addition, the transmission from the central station is coded to a specific monitoring site. The nature of the signal is preferably FSK and transmissions are broadcast on the same frequencies to all sites and the sites are identified by a digital address that is recognized by the FSK receiver. Since this information is critical to the security of the site, redundant coding is preferably used to insure the reliability of the transmission. Further, information requested by the central station from the remote sites will be requested via coded digital messages. These messages will allow verification that the remote site electronics are functioning properly, and responses from the remote sites will be coded into the video waveform (i.e., during blanking intervals).

The remote site video electronics will be discussed in further detail hereinbelow. The TV camera is a generally commercially available TV camera, as is the basic transmitter and receiver, 3 and 4.

Still referring to FIG. 1, the central station comprises a transceiver 6 comprised of a receiver 7 and transmitter 8. The receiver is a multi-channel UHF receiver capable of receiving video information from all sites simultaneously and for receiving such information on a frequency multiplex basis. The bandwidth required for the receiver 7 is approximately 6 megacycles times the number of remote sites being monitored. A modem 9 is coupled to the transmitter 8 for coding a message which is desired to be sent to a particular remote site. Since each remote site will have its own individual binary address, messages will carry the site address which must be recognized by the particular site. The output power of the transmitter 8 is determined by the frequency being used and by the maximum distance required for the central station to transmit. The central station further includes means, described hereinbelow, to detect when a remote site fails to respond to interrogations from the central station so as to cause an alarm condition to exist. This provides a means to detect electromagnetic jamming attempts, power failure, or equipment failure at the remote site.

The output of the receiver 7 is fed to a video buffer amplifier which receives a demodulated waveform from the receiver 7 and filters and shapes it, and provides the demodulated video wave with sufficient gain so as to be useful in the remaining sections of the central station during processing. The output of the video buffer amplifier 10 is fed to a parallel-view A/D converter 21 which continually converts the incoming video signal into a digital word. The A/D converter 21 has 16 levels or thresholds and can divide the video signal into any one of these levels with a high degree of precision. Since the A/D converter 21 is fully parallel it operates on a continuous basis. The information fed out of the A/D converter 21 is provided to a four bit Grey-to-binary converter 22. The code used for the conversion is a Grey code. This is to insure that if the video signal is going through one of the transition points of level during a strobing period, no more than one bit will be in error. This is a similar ambiguity problem to that generally found in encoding technologies.

The A/D converter 21 has adjustable thresholds. This is a very important feature since the portion of the video scenario in which alarms are being monitored may be of a different average light level than the overall light level in the monitored area. Therefore, adjustments are provided that can be of an automatic or manual nature such that once the alarm within the field of view of the camera is established, the minimum and maximum video levels for that area will provide the extremes for the 16 bit converter 21. This gives the A/D converter 21 considerably more power as far as resolution goes than if these thresholds were fixed. In the event the threshold levels are to be set manually, an upper threshold control 21a and lower threshold control 21b will be provided on the central station monitor that will allow the operator to visually and very rapidly set these levels by observing a special display for this purpose on the monitor. This will be described in greater detail hereinbelow.

The speed at which the parallel A/D converter 21 will work will be well beyond the bandwidth of the video camera. This insures that there will not be a tracking error due to a conversion delay. Analog comparators are readily available that will make level decisions in approximately 10 to 20 nanoseconds. Thus, conventional commercial grade integrated circuit comparators can be used.

A latch circuit 20 receives the output of decoder 22 to "hold" the information fed thereto so that new information from decoder 22 can be inhibited from passing through for alarm comparison. Latch circuit 20 may comprise a plurality of D-type flip-flops, one flip-flop for each incoming signal line, as illustrated in FIG. 1 and the detailed function thereof will be described later hereinbelow.

A further decoder 23 is provided to convert the Grey binary word from latch circuit 20 into a natural binary word for each comparison or sample point so that a numerical comparison can be made between the quantized value of the present sample point and the previous corresponding sample point. The converter 23 performs the conversion on a continuous basis in less than 35 nanoseconds.

The dynamic storage unit 24 is coupled to the output of decoder 23 via a selector switch means 19 and stores the sample points as binary numbers for one field. The storage media is, for example, LSI dynamic storage registers coupled together to provide 65,536 bits of storage. The storage register 24 is shifted precisely by a clock signal generated by a phase-locked loop circuit in generator 11 at 2.0MHz. The re-circulating register 24 is under the control of the position controller 15 via the selector 19. In a storage mode the position controller 15, via gate 40 thereof sets the selector switch 19 to connect the output of the Grey-to-BCD converter 23 into the register 24 and the sample point data is entered into register 24 serially for one field. During the next field the position controller 15 connects the Grey-to-BCD converter 23 (via latch 20) and the dynamic storage register 24 into a comparator or subtractor 25 wherein the sample points are numerically compared or subtracted.

The comparator 25 performs the numerical comparison between the stored data in the dynamic register 24 and the real time sample point data coming in from the Grey-to-binary converter 23. Comparator 25 operates on a purely numerical basis by taking the information from the storage register 24 and the information from the converter 23 and subtracting one from the other. Since there is the possibility of a quantizing error occurring in the A/D converter 21, a difference equal to or less than 1 is not considered an alarm condition. Any difference in magnitude greater than 1 is considered an alarm condition.

The output of numerical comparator 25 is fed to a magnitude detector 26 which can be manually set in terms of resolution (or sensitivity of the system) by increasing the difference required for an alarm to be greater than 1, i.e., 2 or more. This is done by varying the reference number set into magnitude detector 26. This has the effect of coarsening or reducing the overall system resolution. The magnitude detector 26 may comprise a comparator or subtractor, similar to comparator 25.

The alarm analyzer 13 takes all the present data on what constitutes an alarm and analyzes it to see if the alarm conditions being received from the numerical comparator 26 constitute an actual alarm. The alarm analyzer 13 may receive inputs that relate to alarm size, alarm sensitivity, and alarm movement, and further may make decisions based on the number of alarms occurring per field to determine whether an actual alarm has occurred. The alarm analyzer 13 determines the degree of automatic alarm analysis that is used in the system to reduce the false alarm rate on an automatic basis. Depending on the expected false alarms that might be encountered in the particular monitored site, different programming and different sets of alarm conditions will be provided to the alarm analyzer.

A simplified alarm analyzer 13 comprises only a counter which will indicate an alarm condition only after a preset number of alarm signals are gated thereto. Additionally, a reset may be provided so that only if a preset number of alarms is received in a given period of time an alarm condition will be indicated. Such an alarm analyzer 13 is illustrated, for example, in FIG. 2 wherein a first counter 30 receives the vertical sync signal and counts the number of vertical sync signals received. Counter 30 will provide an output only after a predetermined number of vertical sync signals, which number has been fed into the counter 30, is received. A main counter 31 is provided to receive the gated alarm signal (see FIG. 1) and if a predetermined number of gated alarm signals, which number is fed into the counter 31, is received before a reset signal is provided by counter 30, an output is provided to the alarm indicators 14.

A line-locked sync generator 11 is provided for generating horizontal and vertical synchronizing signals and sampling point signals which are precisely timed and locked to the line. The leading edges of the vertical and horizontal sync signals are an accurate representation of the beginning of the video and horizontal scans. The sync generator is shown in more detail in FIG. 3.

The outputs of the sync generator 11 are fed to a position controller 15. The position controller 15 receives the various clocking signals from sync generator 11 and tracks the video cameras scanning in the vertical plane and counts the horizontal synchronizing pulses up to 256 pulses, thereby providing a complete field. The position controller 15 includes a field selector 16 which selects the number of fields to be skipped between successive alarm detections which preferably comprises a counter 16a and a selectable decoder 16b. The count in the counter 16a is used to determine the fields in which the intrusion or motion detection is to be carried out. For example, if the selector switch 16c is set to the position shown in FIG. 1, the system will conduct motion or intrusion detection every other field of the video signal. If the selector switch 16c is set to the 64 ms position, the system will conduct detection every fourth field of the video signal.

The position controller 15 further includes a vertical position controller 17, or otherwise termed a line selector. The line selector 17 likewise comprises a counter 17a and a decoder 17b coupled to the output thereof. A selector switch 17c is coupled to the output of the decoder so as to select which lines of the frame in which alarm detection is to be carried out. For example, with the selector switch 17c set as shown in FIG. 1, the system operates on every other line of a field. A frame includes 513 lines, but in the implementation of the present invention, only one half of the lines are used per field. Therefore, a setting of 128 of selector switch 17c provides alarm detection on every other line of a frame. Likewise, setting switch 17c to the 64 position, alarm detection is conducted every fourth line per frame.

The position controller 15 further includes a point selector 18 for determining on which points of a given line alarm detection is conducted. For example, a line contains 128 points in the present embodiment and setting the switch 18c to the position shown in FIG. 1 provides alarm detection on every point on a line. Setting switch 18c to position 64 provides alarm detection at every other point on a line. The point selector 18 comprises a counter 18a coupled to a selectable decoder 18b, similar to the line and field selectors.

Figure 8:
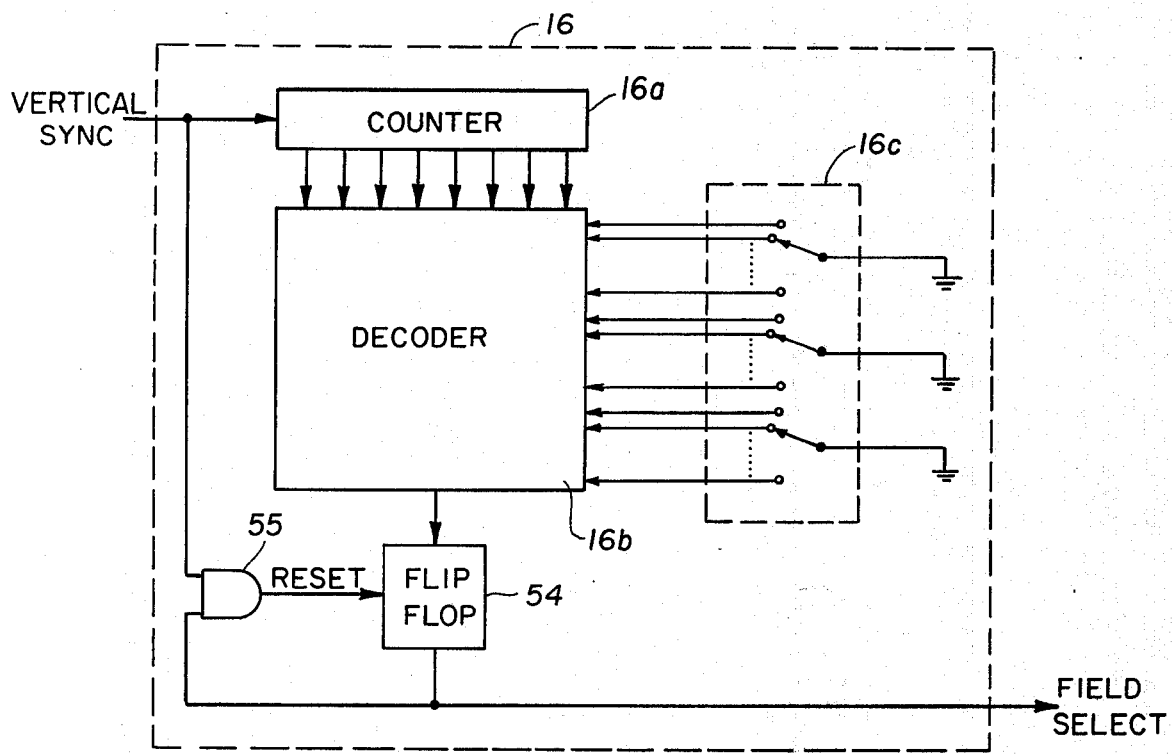
FIG. 8 illustrates the field selector unit of the present invention in greater detail.

The outputs of the selectors 16, 17 and 18 are coupled to respective gates 40-43 as shown in FIG. 1 so as to provide the appropriate gated output control signals to the remainder of the system. Gate 43 is a multi-input AND gate which gates the alarm signals as a function of the settings of the field, line and point selectors. In the present embodiment, alarm detection is constantly taking place, and alarm indication is inhibited as a function of the settings of the field, line and point selectors. This is more efficient from a logic point of view than gating and controlling the individual inputs to the substractor 25, for example, to control when alarm conditions are to be considered. Referring to FIG. 8, the field selector 16 is shown in greater detail. The line selector 17 and the point selector 18 are of substantially identical construction, except that the counters thereof and decoders are scaled with the appropriate numbers required. In FIG. 8, the vertical sync signal is applied to a counter 16a, the outputs of which are coupled to a decoder 16b, the design of which is conventional. Switch 16c, which, in the illustrated embodiment comprises three switch sections, is set by the operator so that the decoder 16b will provide an output at the appropriate timing. The three switch sections of switch 16c are shown as a signal switch section in FIG. 1 for convenience, as are the switches 17c and 18c. The output of the decoder is applied to a flip-flop 54 so as to shape the output and to hold same for a predetermined period of time. The flip-flop is reset through an AND gate and the next vertical sync pulse after the selected vertical sync pulse. The output of the flip-flop 54 is the field select signal which is then coupled to AND gates 40, 42 and 43.

The position controller further includes an alarm area selector 27 which determines which specific area of a given field is to be considered for alarm detection. The alarm area selector is shown in more detail in FIG. 4. The two outputs of the alarm area selector 27 are coupled to AND gate 43 through an AND gate 44 and a switch 45. As clearly seen from FIG. 4, the selector 27 is responsive to the vertical and horizontal sync signals and generates an output which gates the alarm signals to an alarm counter. The first one shot multivibrator 46 has an adjustment resistor 47, as is conventional, and determines the vertical position at which alarm detection is to begin. The setting of the variable resistance 47 varies this vertical position. The output of one shot 46 is fed to a one shot multivibrator 48 having an adjustment resistance 49. The setting of one shot multivibrator 48 determines the length of time that alarm detection is to be carried out and effectively determines the vertical length of the portion of the field that is subject to alarm detection. The horizontal sync is fed to a one shot multivibrator 50 having an adjustment resistance 51. The setting of one shot multivibrator determines position in a given line that alarm detection is to begin. The output of one shot multivibrator 50 is coupled to a further one shot multivibrator 52 having an adjustment resistance 53 which determines the position in the horizontal line that alarm detection is to cease. The output of one shot multivibrator 52 is gated with that of one shot multivibrator 48 in AND gate 44 and is fed to the gate 43 for effectively gating the alarm signal. The result of the provision of the alarm area selector 27 is that given rectangles on the screen can be selected for alarm indication. Anything that occurs outside of the selected rectangle will have no effect on the generation of an alarm indication by the system.

As discussed above, alarm detection by means of the subtraction unit 25 and alarm magnitude detector 26 is constantly being carried out at every point being sampled. The AND gate 43 responds to the various gating signals supplied thereto by the field selector 16, line selector 17, point the selector 18, alarm area selector 27 so as to gate alarm indications through to the alarm counter only at selected points in the frame. The alarm area selector need not have extremely accurate timing elements since minor variations in the timing of the various one-shot multivibrators which comprise same will not introduce false alarms into the system. For example, if the rectangular area selected by the alarm area selector is supposed to begin at a given point in a field, if, on the next field the timing of the one-shot multivibrator is such as to cause the alarm area selector to initiate the rectangular area one point to the right of the original point, this will have no effect on false alarms since the output of alarm area selector merely gates alarm signals through the gate 43 to the counter 13. The alarm area selector 27 has no effect on the comparison circuitry wherein alarm conditions are initially detected.

One of the outputs of the position controller 15 is fed to a pulse generator 32 which generate a "latch" signal which is coupled to an inhibit input of the latch circuit 20 and a "gate" signal which is coupled to one of the inputs of AND gate 43. The pulse generator is illustrated in detail in FIG. 5 and comprises three serially connected one-shot multivibrators 33–35. The output of the first one-shot multivibrator 33 comprises the latch signal and is preferably, in the present embodiment, approximately 250 nanoseconds in duration. The second multivibrator has a delay of approximately 70–80 nanoseconds, which is sufficient for the latch circuit to "settle down", and the output of the third one-shot multivibrator 35 provides a signal of approximately 100 nanoseconds duration, but the leading edge of which is delayed by about 70–80 nanoseconds from the leading edge of the latch signal. The latch and gate signals are also shown in FIG. 5. Thus, gate 43 is not enabled until a sufficient amount of time (approximately 70–80 nanoseconds in the present embodiment) has elapsed for the remaining circuitry to "settle down", thereby preventing transient signals from affecting alarm indication. The input signal to the pulse generator 32 is the anded output of the point selector 18 and line selector 17. Pulse generator 32 thereby provides the latch and gate pulses for each point on each selected line.

Figure 6:
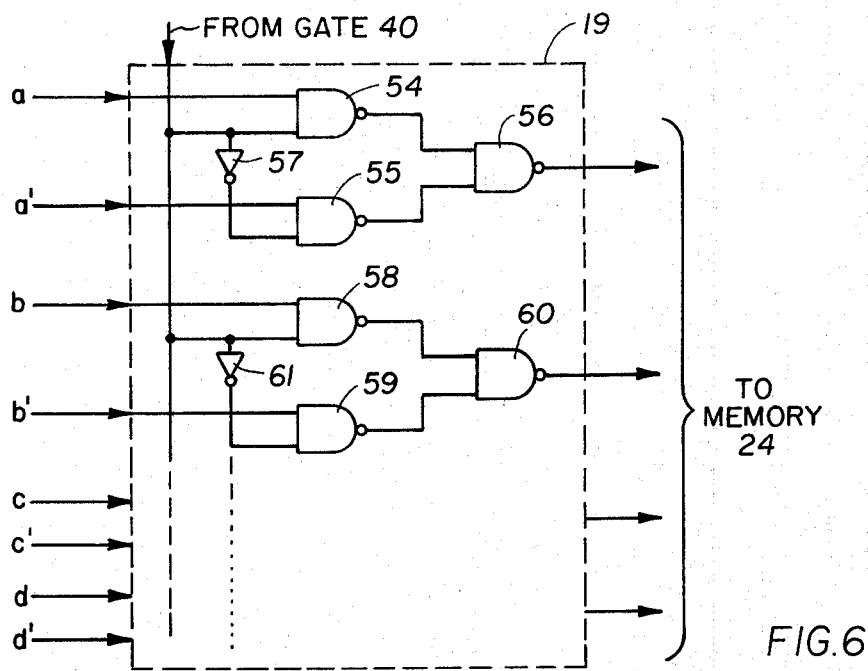
FIG. 6 illustrates the selector 19 of the present invention in greater detail.

Referring again to the memory 24 and selector switching means 19, it is pointed out that the selector 19 is operable as a function of the output of AND gate 40 of the position controller 15. The output of the AND gate 40 is the "anded" combination of the outputs of the field and line selectors. Thus, during the selected field and lines, the selector 19 is operable so as to feed new information from the decoder 23 into the memory 24. During the non-selected fields and lines, the selector 19 is operable so as to re-circulate the previously stored information back into the memory 24 in their proper position. As illustrated in FIG. 1, the signals a, b, c, and d correspond to "new" information coming in from the decoder 23, and signals a', b', c' and d' correspond to re-circulated information which had already been stored in memory 24. The selector 19 is illustrated in more detail in FIG. 6, and comprises a group of AND gates 56 interconnected with the "new" information signal line a and the "re-circulated" information signal line a' as shown in FIG. 6. The gating signal from AND gate 40 is coupled directly to an input of NAND gate 54 and is coupled to the input of the NAND gate 55 via an inverter 57. The output is provided by gate 56. A similar arrangement is provided for signals b and b' by the gates 58–60 and inverter 61. Similar circuitry is provided for signals c, c' and d, d', not illustrated in FIG. 6.

The outputs from the memory 24 are fed to a D/A converter 28, the output of which provide analog signals for "digital" television. The output of converter 28 is fed to a conventional video circuit for generating signals for a TV modulator so as to display information on the monitor. The circuitry for displaying signals on the monitor is conventional and is not illustrated in detail.

A feature of the present invention is the provision for selecting any given area or areas within the field of view of the television camera for alarm detection and indication. For example, in a given field of view of a camera, one or more areas may be critical for alarm detection and indication, whereas the other areas may be less important or not important to be monitored at all. In order to implement this feature, the present invention provides a "light pen" and associated circuitry to select desired areas of the display for alarm detection. In the present invention, the light pen comprises, for example, a photo-diode which is placed adjacent the screen of a monitor at the portions of the screen in which alarm detection and indication is to be carried out. The photo-diode of the light pen is responsive to the electron beams of the TV monitor so as to generate a signal when the light pen is excited by an electron beam. The output signals from the light pen 29 are gated into a register 60 via a switch 61 and an OR gate 62. Since the register 60 is controlled by a shift signal generated by signals received from the sync generator 11, and the TV monitor is operated in synchronism with the output of sync generator 11, the register 60 is shifted in proper synchronism so that when an output is provided by the light pen 29, it is fed into the proper location in register 60 which corresponds to the position of the light pen adjacent the screen of the monitor. In order to select a given area of the screen, the light pen is moved over the given area so that appropriate signals are generated thereby for storage in the register 60, the register 60 storing signals which indicate the selected areas on the monitor. When it is desired to operate the system under control of the light pen area selecting circuitry, the output of the register 60 is provided as a gating input of the alarm gate 43 through and OR gate 63 and the switch 45. A further register 64, having a storage capacity of 128 points (that is, one line of information), is provided and is coupled to the output of switch 61 and to the output of register 60 via an OR gate 65. The output of register 64 is also coupled to an input of OR gate 62. The purpose of register 64 is to provide output information during those periods of time that a line is not selected. That is, if the line selector is set to the "every fourth line" position, the register 64 will operate to repeat the information from the selected line for also the next three lines. As a result, gaps will not exist in the area selected by the light pen and the system will provide proper operation even if the settings of the field, line and point selectors are varied after a given area or areas of the picture are selected by means of the light pen 29.

The switch 61 is shown in the "normal" position. When it is desired to change the areas selected by the light pen, the switch 61 is switched to the non-illustrated position, and subsequent to the area selection, the switch 61 is returned to the illustrated position. Switch 45 in the position controller 15 selects whether the system is under control of the alarm pen circuitry or the alarm area selector 27. In the illustrated position, the system is under control of the alarm area selector 27.

Figure 7:
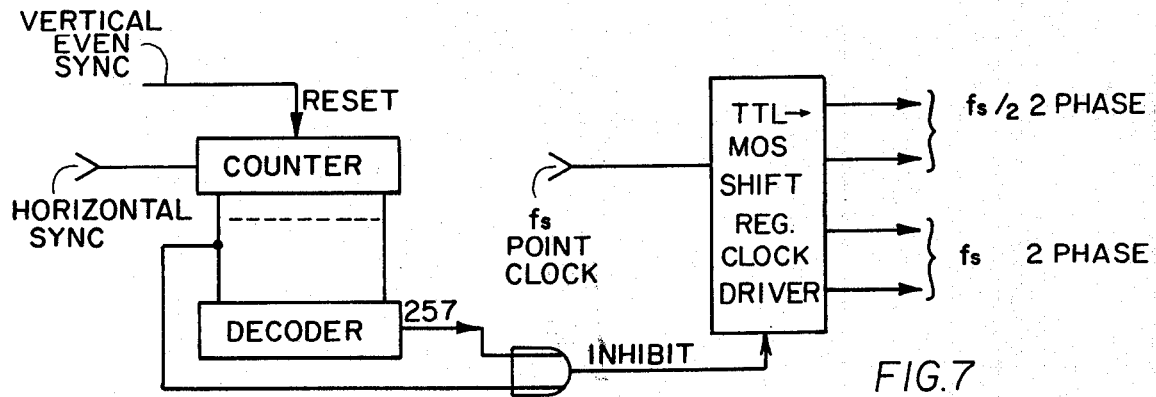
FIG. 7 illustrates the alarm map clock generator in greater detail.

The register 60 and register 64 are controlled by clock signals generated by the alarm map clock generator which is illustrated in more detail in FIG. 7.

A further feature of the invention is the provision of the code-detector 66 which, in combination with a video modulator 67 and the high and low reference adjustment potentiometers 21a and 21b, respectively, of the A/D converter 21, provide improved resolution in the system. The code detector has two outputs which generate a signal when the code representing the maximum amplitude output of the decoder 23 is detected which provides another output signal when the lowest amplitude output of decoder 23 is detected. By using the video modulator to modulate the display provided by the TV monitor, the presence of the high and low codes can be easily detected. That is, the video modulator 67 modulates the picture displayed by the monitor so as to brighten the picture when an output from the code detector 66 is provided. When the switch 68 is set as illustrated in FIG. 1, the potentiometer 21a is adjusted until the picture displayed on the TV monitor begins to be brightened at various points thereon. This indicates that the A/D converter 21 is operating at its maximum upper range. The adjustment 21a is then backed off slightly until the display on the TV monitor is no longer brightened. This setting corresponds to the A/D converter being used at its maximum output for a given display. In order to adjust the low range of the A/D converter 21, the switch 68 is switched to the "low" output of detector 66 and range selector 21b is adjusted as described with respect to adjustment means 21a. In this manner, the A/D converter is adjusted so as to operate over its full usable range, thereby providing improved resolution and accuracy in the system.

When the switch 68 is switched to position 68c, the selected display points are brightened. When switch 68 is moved to its position 68d, the video modulator will modulate the video in the position where an alarm took place. This is clearly seen because the switch terminal 68d is coupled to the output of the OR gate 63 which provides an alarm output only at selected positions. This is by virtue of the fact that the input to the gate 62 is provided from the output of gate 43 of position controller 15.

The video modulator 67 is also effective to modulate the display so as to darken the portions of the display which are being monitored for alarm detection. The "darken" input of video modulator 67 is provided from the output of switch 45.

An "inhibit alarm" switch 69 is provided in position controller 15 for use in testing and/or trouble shooting the system. In the position shown, switch 69 allows alarm signals to be gated through gate 43.

A further switch 70 is provided to either couple the output of the video modulator 67 to the video display signal generator or to couple the digital-type TV signals from the D/A converter 28 to be displayed by the monitor.

A camera control unit 31 receives data from the alarm counter 13 and generates an output in terms of XY coordinate information of alarms. Also, outputs indicative of the rate of motion of the intruder as well as the general area of the monitored site involved in the intrusion may be generated. The function of the camera control unit 36 is to accept data and format it in a message. The messages are then transmitted to the monitored site in a convention coded manner, via the modem 9 and transmitter 8, the messages serving the purpose of camera positioning and zoom. The messages sent to the camera are digital numerical messages that instruct camera servos 37 to move and center the camera 1 on a shifted coordinate system. In the automatic mode, this is not in the true sense, a closed loop system. The digital information sent from the camera control unit 36 instructs the servo motor drive units on the camera 1 to rotate a given number of revolutions which, knowing the gearing, and knowing the position of the camera, will define the camera settling place. Therefore there is no requirement for a closed feedback loop to servo the cameras to the proper position. Once the camera is located in its new position, the monitoring process continues and alarms are gathered and refinements are made from the new alarm information as to exactly what the camera should do. The camera control unit 36 has two modes of operation, the first being the automatic mode described above which includes an automatic sequencer which functions to step the camera 1 through the monitored site at long focal lengths and record frames on video tape showing the monitored site in detail. This is a full digital implementation. For a camera with a zoom factor of 10, where at its minimum focal length just encompasses the entire monitored site, by zooming to the long focal length, allows the camera to divide the monitored site into roughly 100 sections and record on a video tape recorder a frame from each one of these sections. This process takes place in the automatic mode and in the presence of alarms to assure that decoys are not being used to attract the camera's attention, as well as scanning the monitored site of high resolutions. Manual control is provided to the cameras via the control unit 36 which can be used for manual steering and zooming. This allows the operator at the central station to observe the monitor and to steer the camera and control its resolution so as to see in detail the entire monitored site. On manual control, the nature of the control signals are still digital and the camera still steps from one location to the next, but yet provides high speed tracking. Whenever the camera is moving, whether it be tracking intrusions, scanning the site or other manual control, the video tape recorder is activated and is keeping a record of all camera activity.

An alarm relay unit 38 may be provided to relay alarms to remote locations. This can be provided via telephone lines with automatic dialers, hardware lines, RF communication links, or the use of the AC power distribution system as a communication link. The alarm relay unit 38 is preferably activated in the event the manual overrides have not been used. This assures that if the operator is not present or is not performing his duties correctly, other locations will be alarmed immediately. Whenever the alarm relay unit 38 is activated, the video tape recorder is recording information at the monitored site for subsequent replay and analysis. The use of the alarm relay unit 38 allows policing agencies, which have to take a course of action, to be tied into the monitored site via the central station without having to rely on a human interface at the central station. This assures that no time would be lost in initiating the steps necessary to take action in the event of an alarm.

Figure 16:
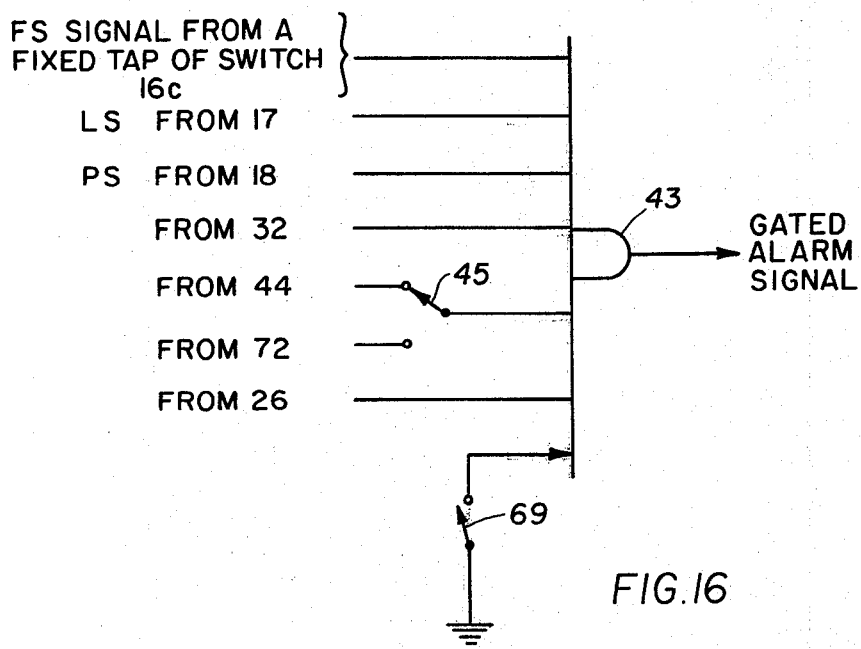
FIG. 16 illustrates a modified form of the invention.

In a modified form of the invention, the AND gate 43 and the connections thereto are shown as in FIG. 16. The remainder of the system is exactly the same as shown in FIG. 1, except that the line from the switch 16C to the AND gate 43 is broken where indicated at reference numeral 73 in FIG. 1. As a result of this construction, it is possible to update the information contained in the memory 24 at a very slow rate and to gate through alarm signals at a relatively high rate. This is particularly the case when the AND gate 43 has its upper input as shown in FIG. 16 connected to the 32 ms tap of switch 16C and the wiper arm of switch 16C as set at the 4.5 or infinity setting thereof. By virtue of this modification, it is possible to advantageously detect slow moving as well as fast moving changes in the scene being monitored by the system.

According to a further feature of the invention, an inverter 71 and bypass switch 72 is coupled between the output of OR gate 63 and switch 45. This arrangement allows the system to selectively ignore areas which would otherwise generally cause false alarms. For example, when viewing an outdoor scene, leaves fluttering in the wind could possibly cause a false alarm. In order to eliminate this difficulty, the switch 72 is set to bypass inverter 71. The system is operated and alarms generated, for example, by the moving leaves are allowed to pass through the AND gate 43 and the information concerning these alarms is stored in the main register 60 of the light pen circuitry. Then, after all of the potentially false alarm points are stored in register 60, the switch 72 is set so that the inverter is no longer bypassed. In this arrangement, the output from the inverter will essentially inhibit alarm signals being generated at points where the false alarms are likely to occur. In the normal operating mode, for example, when using the light pen described hereinabove, the switch 72 is set to bypass inverter 71.

Figure 9:
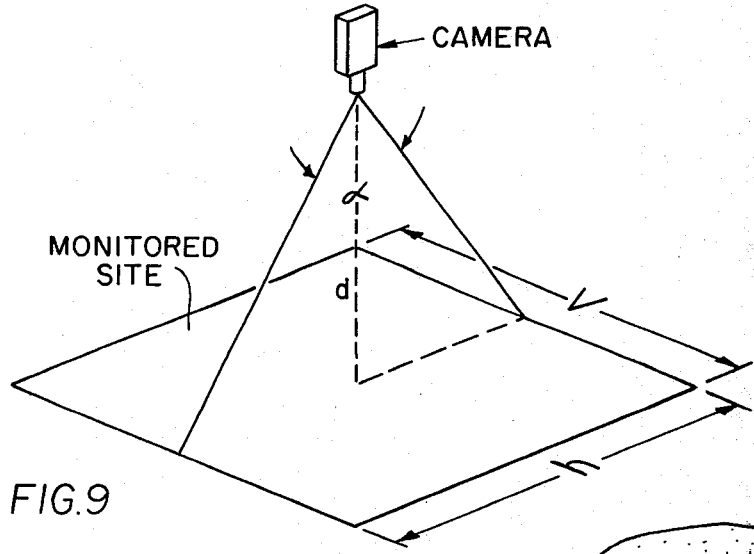
FIGS. 9–14 illustrate various mathematical relationships used in explaining a mathematical model of the system of the present invention.

In order to further demonstrate the present invention and to highlight the improvements provided thereby, a mathematical model has been formulated defining the probability of detection in terms of several expected variables associated with intrusions. FIG. 9 illustrates a particulara monitored site and some of its variables.

As seen in FIG. 9, the area of the site is fixed, and consists of the product V × H in feet. Since the television camera generally have an aspect ratio, the vertical dimension V is ¾ of the horizontal dimension $h$ and the area can be represented as:

$$A = ¾ h^2$$

FIG. 9 depicts the camera located normally over the monitored site. This is a particular example used to demonstrate how the system lends itself to a detailed analysis and certainly other camera locations relative to the monitored site could be considered. The distance that the camera is located from the monitored site is determined by the lens focal length usually indicated in millimeters. The distance normally from the monitored site to the camera is indicated as $d$ and is related to the size of the monitored site through the focal length by the following expression:

$$h = \frac{Kd}{f}$$

where:
$d$ = normal distance (camera-to-object)
$f$ = focal length (mm)
$K$ = proportionality constant
$h$ = horizontal width of viewed area.

This relationship allows the area of the monitored site to be re-expressed in terms of the distance to the camera and the focal length of the camera lens as follows:

$$A = \frac{3}{4} \left( \frac{Kd}{f} \right)^2$$

The proportionality constant K used for this equation for distances expressed in feet and focal length in millimeters is 12.5. This is a constant that would make the equation compatible with existing closed circuit television camera lenses. From this relationship, the Horizontal Viewing Angle indicated by alpha ($\alpha$) in FIG. 9 can be expressed as follows:

$$\alpha_H = 2\tan \frac{1/2(Kd/f)}{d}$$

or $$\alpha_H = 2\tan (K/zf)$$

It can be noted from the above expression, that as the distance to the monitored area increases from the camera, the linear dimensions of the monitored area increase proportionally. To use the above expression as an example of expected viewing angles, a 10 to 1 zoom lens could be considered capable of zooming from a 12mm focal length to a 120mm focal length. This would have the effect of the horizontal viewing angle changing from approximately 55° at 12mm to 6° at 120mm. It will be later pointed out that the zoom capability if functionally related to the probability of detection. The ratio in which the area is reduced as a function of the zoom factor or change in focal length can be expressed as follows:

$$R_A = \left( \frac{f\,max}{f\,min} \right)^2 = (Z.F)^2$$

$R_A$ is the ratio of the areas and therefore, it can be seen with a 10 to 1 zoom lens. The area being observed changes by a factor of 100.

The nature of the scanning is such that the camera samples points on the monitored area for the purposes of analysis if it is assumed that these points are regularly spaced and forms a grid of intersections on the monitored area that remains constant independent of the magnification of the angle or, in other words, the number of sample points on any scene observed by the monitor will always be constant. The average number of rectangles, which the monitored scene is sub-divided into, can be analyzed. For example if there were 32 sample points horizontally and 32 lines in a field on which sample points were to be taken, the total number of points sampled would be 1024 or effectively breaking the monitored site into over 1000 small rectangles. The area of each rectangle could be expressed in terms of the number of horizontal or vertical sampling points as follows:

$$\text{Area of Rectangle} = \frac{3}{4} \left( \frac{Kd}{nf} \right)^2$$

The above relationship that the number of vertical and horizontal sampling points are equal to N.

Therefore the model can be envisioned as a matrix of sample points on the monitored site. For purposes of analysis the sample points will be considered infinitely small in size which is consistent with a physical situation as far as the sampling of the video wave form goes. The parts will be sampled periodically at a multiple of a frame rate compared with the previous frame that was stored and that data will be stored for the next comparison cycle. Therefore the data is being sampled, compared, and stored on a continuous basis. The model must consider this aspect of it due to the coming back to resample and compare a point at a definite time interval. Therefore, the possibility exists that an intrusion has taken place and the intruder has vanished from that point by the time the next sample cycle occurs. There are three major aspects to the detection probability.

1. Sample point resolution: This aspect of detection probability is concerned with the density of sample points and the size of the intruder and his probability of actually encountering one of the sample points. In the model the intruder is considered as a disc of diameter D that moves across the monitored site, with a velocity V. Therefore, the first part of the problem is, Is the sampling point density sufficient when an intruder moves into a monitored side, will he indeed encounter one of the sample points without considering the timed aspects?

2. Temporal considerations on probability of detection: Since the intruder is moving at some velocity it is possible that even though he encounters one of the sample points, the nature of his velocity and size is not sufficient for the detector to observe him due to the scanning period or pattern generation of the scanning points.

3. Grey Scale Aspects of Detection

Since the analog-to-digital (A/D) converter senses differences in grey scale, there is a certain probability that when the intruder does occupy a sample point and remains there for a period sufficient to be detected, that due to his grey scale being sufficiently similar to the background grey scale, the resolution of the detector does not allow him to be detected.

These three aspects of detection form three compound probabilities.

1. The probability of the intruder countering a sample point, 2. the conditional probability that once he has encountered the sample point that remains there for sufficient duration to be detected; and 3. that after the first two conditions have been met, his grey scale is such that the detector will resolve his presence. These three probabilities and the composite probabilities are discussed in order below.

1. Probability of Detection as a Function of Sample Point Density

Figure 10:
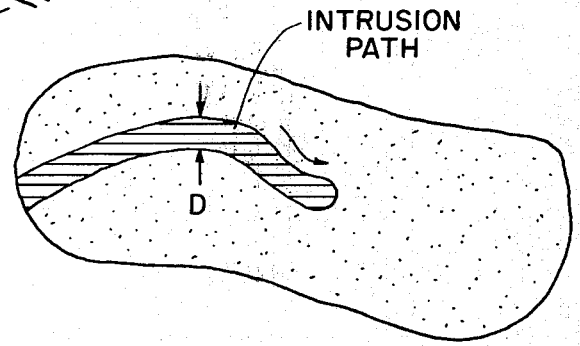

This portion discusses a mathematical mode that will simulate the probability of an intruder encountering a sample point, and reference is made to FIG. 10 in order to more fully understand the model.

The picture of FIG. 10 considers the area with the random points, or sample points, scattered uniformly. It neglects the absolute latostructure or regular array that is generated by the detection equipment. The average density of points is the same. The intruder is considered to be a disc with a diameter D that moves across this area and encounters a given number of sample points. The intruder moves at a speed of V feet per second. The sample point density $\delta_{SP}$ is given below and relates the density of sample points in terms of points per unit area to the location of the camera, its focal length, and the number of sample points generated per pattern:

$$\delta_{SP} = \frac{\text{Total Number of Sample Points}}{\text{Total Area}}$$

$$= \frac{n^2}{3/4 \left(\frac{Kd}{f}\right)^2} = \frac{4}{3} \left[\frac{nf}{Kd}\right]^2$$

where:
$\delta_P$ = Sample Point Density
$n$ = No. Sample Points

To assess the probability of the intruder encountering one of these sample points, the intruder or disc can be envisioned as moving across an area at a velocity V. The average number of alarms will be related to the amount of area that the intruder covers. The area swept out by the intruder (illustrated in FIG. 10) is necessarily related time and the following expression approximates it.

$$A_I(t) = VDt - \left[\frac{D^2}{2}(1-\pi/4)\right]$$

$$A_I(t) \approx VDt$$

Where $A_I(t)$ is equal to the area swept out by the intruder as a function of time. The negative term is merely a compensating term because of the circular nature of the intruder, but can reasonably be approximated by the abbreviated expression, since after a reasonable difference distance has been covered the negative term becomes insignificant. It can further be seen that the average number of alarms generated will increase monotonically with the time and can be expressed as follows:

$$\overline{a_I} = A_I(t) \delta_{sp}$$

$$= \frac{4}{3} VD \left[\frac{nf}{Kd}\right]^2 t$$

The average number of alarms or dots encountered by the disc will be the product of the number of dots per unit area times the total area encountered. The mean time to one alarm can be expressed by setting the average number of alarms equal to 1 and calculating the time. The following expression results where $t_{\overline{a_I}}$ is the average time to 1 alarm.

$$t_{\overline{a_L}} = \frac{3}{4VD} \left[\frac{Kd}{nf}\right]^2$$

If the average time to one alarm is known, by knowing the velocity of the intruder the average distance travelled to the first alarm or the interval between subsequent alarms can be calculated as the product of the time of the average alarm times the velocity.

$$\overline{S}_{AL} = \frac{3}{4D} \left[\frac{Kd}{nf}\right]^2$$

It is reasonable to assume that the probability density function for the average distance to an alarm will be a symmetrical distribution. This implies that the mean value of the distribution is the average distance to an alarm or the probability of the intruder being detected when he has traversed a distance equal to this average distance is 50%. Therefore the detection probability of an intruder travelling a distance S is 0.5.

2. Temporal Detection Considerations

The conditional probability of detection, once it is known that the intruder has encountered an alarm point as indicated in the analysis above, will now be evaluated. The scanning scheme or the method in which the sample points are taken must necessarily be accomplished as a function of time if the system is to be compatible with commercial TV cameras. Another consideration is the total storage requirements placed on the detection circuitry and it can be recognized that as the rate in which the scanning points are generated is increased, so are the storage requirements. To keep the analysis general, so that trade offs can be made to achieve any desired level of detection probability, the following conditions will be imposed on the scanning process. The restrictions put on the scanning process are consistent with the actual operation of the hardware described above in that stored data is compared with real time data looking for differences in density at the sample points and the real time data used for the comparison is stored for the next cycle. Therefore, for each sample point there is continually data in storage representing the previous grey scale of that sample point. The period of time between sample points raises the question of the temporal aspects of detection. This is a controllable design parameter but for purposes of analysis, the pattern cycle time will be considered a variable and indicated as $T_s$.

Figure 11:
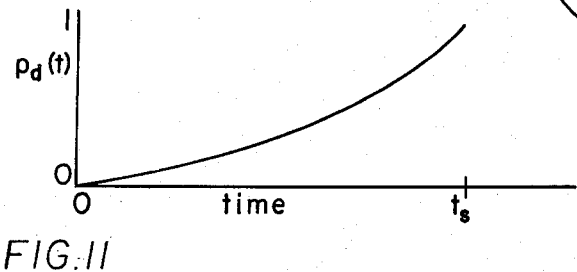

$T_s$ can be considered as the period of time that the stored data is held for comparison. The question that arises concerning the probability of detection from a temporal view is: when an intruder encounters a sample point does he remain on that sample point for a period of time sufficient for detection It can be immediately noted, that if he remains on the sample point or masks it, while moving across it for a period of time greater than $T_s$, he will be detected with certainty. If the period of time he remains on the sample point falls below $T_s$, the probability with which he is detected falls between the range of 0 and 1. For example, if $T_s$ is 1 second, and the intruder masks a sample point for 500 milliseconds, the probability of his detection is 0.5. It can be seen qualitatively that if the occupancy time of the intruder on a sample point is less than $T_s$, that the probability of detection monotonically increases from 0 occupancy time up until $T_s$, as shown in FIG. 11. In FIG. 11, the indicated probability is the conditional probability that occurs after it is known that the intruder has intersected a sample point.

Figure 12:
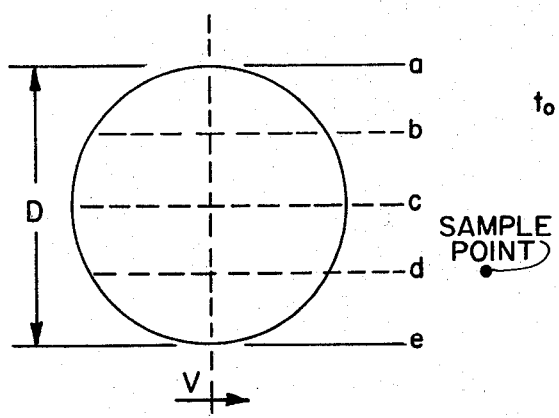

Again considering the model of the intruder to be a disc, of diameter D and moving at a velocity V, it can be seen that depending on the path over which the disc crosses the sample point different occupancy times result. This is shown in FIG. 12. It can be noted from FIG. 12 that if thee disc passes over the sample point, at point $a$ or point $e$, the occupancy time is approximately 0. If the disc passes over the sample point at its diameter, the occupancy time is equal to the diameter of the disc divided by the velocity, which is the maximum occupancy time for a given velocity. If the disc transverses the dot at inbetween locations such as $b$ or $d$, the occupancy time will be an intermediate value between the maximum occurring at the diameter and the minimum occurring at locations $a$ and $e$. Since complete randomness was assumed in terms of the dot location, and it is further assumed that the intruder's motion is random in nature, only that it does not change direction while changing a dot which holds true on the average if this motion is truely random, it follows that the distribution relating to the portion or the probability of intersecting a certain portion of the disc is also random.

The probability density function indicating that the location at which the disc is intersected is completely random, and therefore, the density function is rectangular in shape. Therefore if the intersection points are completely random the occupancy times will be distributed as shown in FIG. 13.

Figure 13:
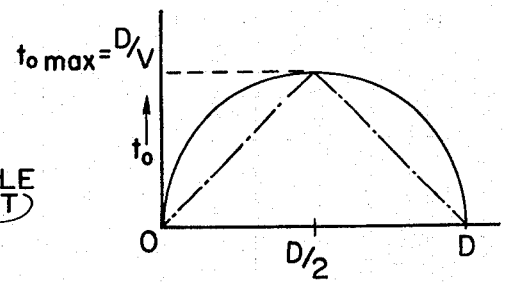
Figure 14:
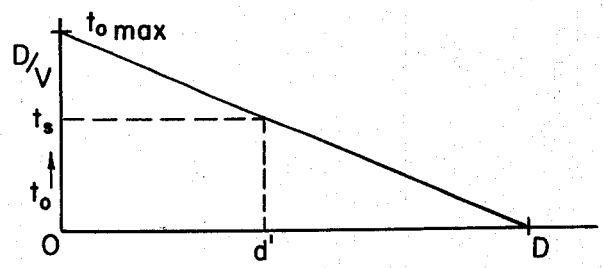

The semicircular curve in FIG. 13 indicates the occupancy time as a function of the intersection point on the disc. To simplify the analysis, and avoid somewhat cumbersome equations, an approximation to the occupancy time can be made by the straight line approximation indicated in FIG. 13 with dash lines. It should be noted that this is a very conservative approximation since at all points along the approximation, it reduces the occupancy time and therefore significantly reduces the probability of detection. To simplify the mathematics, it can be noted that the occupancy times are linearly distributed across the diameter of the disc ranging from the maximum of D/V to 0 at the extreme. Since the occupancy time is independent of the probability of the occurrence of the sample intersecting a specific value of the diameter on the disc due to the rectangular probability distribution, FIG. 13 can be re-drawn as shown in FIG. 14. It should be noted that FIG. 14 carries the same information and involves the same area $s$ the triangular representation in FIG. 13. The equation of the straight line approximation is:

$$T_o = \frac{-d'}{V} + \frac{D}{V} = \frac{1}{V}[D - d']$$

The ordinate variable is $T_o$ or occupancy time and the abscissa is a running variable relating to distance $d'$. It can be seen from FIG. 14 that two conditions exist.

1. Where the maximum occupancy time is greater than the patterned cycle time which assures detection and the converse situation where the maximum occupancy time is less than the patterned cycle time. For any values of $T_o$ greater than $T_s$, the conditional probability of detection on a temporal basis is 1. For values of $T_s$ that exceed all values of $T_o$, the probability of detection is less than 1. Considering a case where $T_o$ can exceed the cycle time, it can be noted that the percentage of time that $T_o$ will exceed the patterned cycle time is given below by:

$$\frac{d's}{D} = 1 - \frac{Vts}{D} = p\{t_o \geq t_s\}$$

The above equation indicates the probability of $T_o$ being greater than or equal to $T_s$. This actually is the probability of this condition occurring. When this condition does occur, the detection probability is 1 for certainty.

$$P_d\{t_o \geq t_s\} = (1)$$

Added to this mutually exclusive probability must be the probability of detection when $T_o$ is less than $T_s$ times the probability of this occurrence. The probability of $T_o$ being less than $T_s$ is 1 — the probability of it being greater or:

$$p\{t_o \leq t_s\} = 1 - p\{t_o \geq ts\} = 1 - \frac{d'}{D} = \frac{V}{D}t_s$$

The above equation indicates the probability with which the event of the occupancy time being less than the pattern cycle time occurs. When this condition occurs, the probability of detection must be evaluated. This can be accomplished by considering the average occupancy time, between 0 and $T_s$. Due to the linear nature of the distribution the average occupancy time is:

$$\bar{T_o}(t_o \leq t_s) = \frac{ts}{z}$$

Therefore the conditional probability of detection when the occupancy time is less than $T_s$ is as follows:

$$P_d\{t_o \leq t_s\} = \frac{(\frac{ts}{z})Vt_s}{t_s D} = \frac{Vts}{2D}$$

The total conditional probability of detecting an intruder on an occupancy basis in the case where the occupancy time can be greater than the pattern cycle time, is the sum of the two probabilities. Since they are mutually exclusive, the occupancy time cannot simultaneously be greater and less than the system cycle time. Therefore, the total probability of detection on a temporal basis is:

$$p_d(t) = 1(1 - \frac{Vts}{D}) + \frac{Vts}{zD}$$

($t_o$ can be greater then $t_s$)

$$= 1 - \frac{Vts}{zD} \text{ for } D/V > t_s$$

Now considering the other case where the ratio D/V is less than $T_s$, or in other words, the occupancy time never exceeds the pattern cycle time. Again, the mean occupancy time will be used for estimating the probability due to the linearity of the distribution, and the average occupancy time or average ordinant will be $\bar{t_o} = D/(2V)$. The probability of detection will be $T_o$ averaged over $T_s$ or:

$$p_d(t) = \frac{\bar{t_o}}{t_s} = \frac{D}{2Vts} \text{ for } D/V < t_s$$

In summary, the conditional probability of detection, once it is known that the intruder has intercepted a sample point, is given by the following two relationships, for the two possible physical situations that may exist.

$$p_d(t) = 1 - \frac{Vts}{zD} \text{ for } D/V > t_s$$

$$p_d(t) = \frac{D}{2Vts} \text{ for } D/V < t_s$$

3. Probability of Detection Considering Grey Scale

Once it has been established that the intruder has intersected a sample point location, and that his occupancy on the sample point location was of sufficient duration to be detected, the possibility still exists, that due to his grey scale, the level detectors may not sense him. The digital detectors used in analyzing grey scale are A/D converters that have a predetermined number of bits. The number of bits used in the A/D conversion determine the number of quantitizing levels that will be used in evaluating shade of grey scale as per the following relationship:

number of Bits = $Log_2$ (number of levels)

Since at each level in the conversion the possibility exists that an ambiguity will occur, which results from the intruder having a grey scale that is comparable in level so that of a transition point in the A/D converter, and the A/D converter makes a decision between two levels, it is necessary to reduce the resolution for the number of levels of grey scale sensed by a factor of 2. This eliminates, with certainty, all ambiguities of this nature. The probability with which the intruder will not be detected due to grey scale is inversely proportional to the number of detectable levels available at the converter. For example, if there are eight discreet levels of grey scale being monitored, the probability that the intruder will not be detected is ⅛. This assumes randomness in the background of the monitored scene, as well as randomness in the gray scale of the intruder. This can be expressed quantitatively as follows:

$$p_{bit}(G.S.) = 1 - \frac{2}{2^{n'}}$$

$$= 1 - 2^{1-n'}$$

where $n'$ = bits of conversion.

The above equation states that the probability of detection is 1 minus the probability of the intruder not being detected. For example, if a 4 bit converter is used, the probability at a given point of the intruder being detected is ⅞. The number of bits used in the conversion can be a variable.

4. Composite Alarm Probabilities

The previous three sections established conditional probabilities for different types of detection. In order for an alarm to exist, all three detection aspects have to mutually exist. Therefore, the probability on a binomial basis of getting an alarm at one particular sample point is the product of all three probabilities or:

$$P_d(\bar{S}, t, G.S.) = P_d(\bar{S}) p_d(t) p_d(G.S.)$$

$$= (\frac{1}{2})(1 - \frac{Vts}{ZD})(1 - 2^{1-n'}) \text{ for } D/V > t_s$$

OR $$(\frac{1}{2})(\frac{D}{2Vts})(1 - 2^{1-n'}) \text{ for } D/V < t_s$$

simplifying $$= \frac{(2^{n'} - 2)}{2^{n'}} \frac{(ZD - Vts)}{\cdot Z D} \text{ for } D/V \geq t_s$$

OR $$= \frac{(2^{n'} - 2)D}{2^{n'} \cdot 2Vt_s} \text{ for } D/V \leq t_s$$

The above equation is finding the probability of detection at a given sample point.

It is necessary to define and develop a relationship that defines an alarm condition since it can be seen from the above equations that relying on one sample point does not necessarily give a sufficient probability of detection.

5. Alarm Definition

The alarm definition presented here for the purposes of the mathematical model is one that relates to the distance moved by the intruder inside the monitored area. The distance does not necesssarily need to be in a straight line, but relates only to the total distance covered. It is also recognized that sometimes the monitored site will be in a very very large area while at other times, it will be very small. To relate this movement to an absolute distance does not seem practical, rather relating the alarm to a percentage distance traversed in the monitored site would seemingly be realistic. It will be assumed that if the intruder travels a distance equal to an arbitrary value of 1/10 of the horizontal distance of the monitored site without being detected, this will by definition be called a detector failure. This allows the detection process to take a period of time before making a decision on an alarm condition, that allows the intruder up to 1/10 the horizonotal dimension of the monitored site before a detector failure is considered to have taken place.

With this definition the number of sample points that the intruder will encounter over this distance can be calculated by recalling the mean distance between sample points as being:

S = mean distance between sample point $$= \frac{3}{4D} [ \frac{kd}{nf} ]^2$$

which yields the distance in feet on the average between sample points that the intruder encounters and masks again envisioning him as a mask. The actual number of points will be this distance divided into the distance the intruder is allowed to move before an alarm failure is considered to have taken place. This can be expressed as follows:

$$[ \frac{n}{10} ] \frac{4D}{3} [ \frac{nf}{Kd} ]^2 = \text{average number of sample points encountered} = N$$

Therefore a number of sample points have been encountered and at each point there was a certain probability of detection. The binomial distribution indicates the various ways that the sample points can be encountered when detection or lack of detection takes place.

For example, consider the probability of detection as P, the probability of no detection as Q and the number of points encountered as 4. The following relationship then summarizes the probabilities:

$$p^4 + 4 p^3q + 6 p^2q^2 + 4 p q^3 + q^4$$

The numerical coefficients of each term indicate the number of ways that the alarms can take place. For example the second term for $p^3q$ indicates that 3 detections have taken place and 1 failure has taken place and the order in which they could have occurred could have been one of four possible ways.

$$pppq$$

$$ppqp$$

$$pqpp$$

$$qppp$$

A system failure would only have taken place in the event all four points resulted in a failure to detect which is indicated by the right-most term $q^4$. Therefore, the probability that the system will detect the intruder, is 1 minus the probability that it will not, or functionally:

$$p'_d = 1 - (p_f)^N$$

where
$p_d$ indicates the probability of detection,
$p_f$ indicates the probability of failure, and
$N$ indicates the number of sample points encountered.

The probability of failure is one minus the probability of success that was calculated above. Substituting into this relationship the following equations result:

$$p'_d = 1 - [1 - p_d(\overline{S},t,G.S.)]^N$$

$$= 1 - [1 - \frac{(2^{n'} - Z)(ZD - Vts)}{(2^{n'} + Z)D}](\frac{n}{10} \frac{4D}{3} (\frac{nf}{Kd})^2)$$

$$D/V \geq t_s$$

AND $$1 - [1 - \frac{(2^{n'} - z)D}{2^{n'} + z Vts}](\frac{n}{10} \frac{4D}{3} (\frac{nf}{Kd})^2)$$

$$D/V \leq t_s$$

The above equations yield the probability of detecting an intruder in accordance with the above definition.

The above mathematical description serves to demonstrate a very important characteristic of the system, namely that it is predictable and calculable, as far as the probability of detecting an intruder, and that the prediction considers intruder characteristics. It should be clear that other situations may exist where the cameras can be located at different viewing angles, and have different zoom lenses which modifies the problem.

It should be clear that various modifications and alterations may be made to the present inventive concept. For example, a plurality of remote sites may be connected to a central station on a multiplex basis and any pertinent information may be relayed between the remote sites and the central stations, also on a multiplex basis. Preferably, each remote station has a unique code which enables it to be identified among the other remote stations so that only the selected remote station will respond to messages intended therefor. Alarm analyzers may be provided which are responsive not only to the number and location of an alarm condition, but also to size, movement, etc. of the alarm condition. While a light pen was shown for programming the apparatus so as to be responsive to alarm signals occurring in predetermined selected areas, other means may be used. For example, a matrix of switching devices, or the like, could be used in order to supply the appropriate information to the main register to select areas of the field of view of the camera. Such area selection is particularly useful when it is desired to provide "safe" areas so that movement can occur within the "safe" areas without causing alarm conditions.

In the illustrated embodiment, all of the equipment is synchronized in common to the power line. That is, the video camera, video monitor and alarm detection equipment of the present invention all receive their sync signals from the line lock sync generator 11. However, it should be clear that other synchronizing means could be used. For example, synchronizing signals could be derived from other signals containing synchronous information, as desired.

What is claimed is:

1. A motion and intrusion detection system comprising:
   a video camera for viewing a given field of view and for generating video signals corresponding to said field of view;
   means responsive to said video signals for converting said video signals into a plurality of coded digital signals which correspond to the grey level of said video signal at a plurality of points in said field of view of said camera;
   storage means for selectively storing said coded information corresponding to said plurality of points;
   means for comparing predetermined coded information corresponding to said plurality of points from a first scan of said camera with the coded information corresponding to said plurality of points generated during a subsequent scan of said camera on a point-by-point basis;
   means for generating an alarm signal when the difference between said compared signals for corresponding points exceeds a predetermined value; and
   means responsive to said alarm signals for generating an alarm indication.

2. Apparatus according to claim 1 wherein said storage means includes means for selectively re-circulating the information corresponding to a complete scan of the field of view of said camera at selected periods of time.

3. Apparatus according to claim 1 wherein said alarm indication means includes means for generating an alarm indication after receipt of a predetermined number of said alarm signals.

4. Apparatus according to claim 1 wherein said converting means comprises an analog-to-digital converter for converting the video signal into a digital signal; means coupled to the output of said converting means for detecting maximum and minimum values of the output of said converting means; and means for adjusting the high and low conversion level of said analog-to-digital converter.

5. Apparatus according to claim 1 comprising means for displaying said video signals on a monitor; and means for modulating the points on said displayed video signal at which alarm detection is to be carried out.

6. Apparatus according to claim 1 comprising means coupled to said alarm indication means for transmitting alarm information to remote points.

7. Apparatus according to claim 1 comprising means for displaying video signals on a monitor; and a digital-to-analog converter coupled to the output of said storage means for generating analog signals corresponding to the contents of said storage means, said analog signals being coupled to said display means for displaying a digital-type representation of the field of view of said camera.

8. Apparatus according to claim 1 comprising means for displaying the video signals received from said camera on a video monitor; and means responsive to the output of said alarm signal generating means for modulating the video signal displayed on said monitor so as to impart a predetermined characteristic to the display on said monitor at portions where alarm signals are generated.

9. Apparatus according to claim 8 wherein said modulator modulates said portions where an alarm signal is generated so as to darken the display at said portions.

10. Apparatus according to claim 1 comprising a camera control means responsive to said alarm signals which are coupled to said alarm indication means for controlling the position of said camera as a function of said alarm signals.

11. Apparatus according to claim 10 wherein said video camera comprises a zoom lens, and wherein said camera control means comprises means for varying the focal length of said zoom lens responsive to said alarm signals coupled to said alarm indication means.

12. Apparatus according to claim 1 comprising means for selecting at least one random area of the field of view of said video camera; said means for generating an alarm signal being responsive to the output of said random area selecting means for generating said alarm signal only during said selected random areas.

13. Apparatus according to claim 12 comprising means for displaying the video signal on a monitor, and wherein said random area selecting means comprises a light pen adapted to be located adjacent said display on said monitor for generating a signal corresponding to the position said light pen is placed adjacent said display.

14. Apparatus according to claim 13 comprising a register means responsive to the outputs of said light pen for storing an indication of the position of said light pen on said display, and means for generating signals corresponding to the positions of said light pen on said display such that said alarm signals are coupled to said alarm indication means only when they occur during said at least one selected area.

15. Apparatus according to claim 14 comprising a buffer register coupled to said register means for storing one line of information, and means responsive to the output of said register means and to the output of said buffer register for coupling the output of at least one of said register and buffer register to said means for generating said alarm signal.

16. Apparatus according to claim 1 wherein said alarm signal generating means includes means for selecting at least one rectangular portion of the field of view of said camera such that alarm signals are coupled to said alarm indication generating means only for alarm signals generated within said selected rectangular portion.

17. Apparatus according to claim 16 wherein said alarm signal generating means includes alarm gating means responsive to said means for selecting said portion of said field of view for gating said alarm signals to said alarm indication means.

18. Apparatus according to claim 17 wherein said means for selecting at least one portion of said field of view of said camera comprises first means for generating a signal of predetermined time duration and having a predetermined delay relative to the beginning of a scan of the field of view of said camera; second means for generating a signal having a predetermined duration and having a predetermined time delay relative to the beginning of scanning of each line of said field of view of said camera; and coincidence means for gating the outputs from said first and second means to said alarm gating means.

19. Apparatus according to claim 18 wherein said first means comprise a pair of serially connected one-shot multivibrators having adjustable time delays, and said second means comprises a pair of serially connected one-shot multivibrators having adjustable time delays.

20. Apparatus according to claim 19 comprising means for generating horizontal sync signals and vertical sync signals, said first means being responsive to said vertical sync signals and said second means being responsive to said horizontal sync signals.

21. Apparatus according to claim 1 wherein said alarm signal generating means includes means for generating gating signals only at times corresponding to the timing of predetermined points of a given scan of said camera; and alarm gating means responsive to said gating signals for gating selected alarm signals to said alarm indication means.

22. Apparatus according to claim 21 wherein said camera produces a plurality of successive scanning fields, and wherein said means for generating gating signals, comprises:
means for selecting predetermined fields of said plurality of fields and for generating a field-select signal during the time that said predetermined fields are present;
means for selecting predetermined scanning lines within a field and generating a line-select signal during the presence of said predetermined scanning lines;
means for selecting predetermined scanning points on said scanning lines and for generating a point-select signal when said predetermined points are present; and
means responsive at least to said field-selelct, line-select and point-select signals for generating said gating signals.

23. Apparatus according to claim 22 wherein said alarm gating means comprises means responsive to said alarm signals to said gating signals for generating gated alarm signals.

24. Apparatus according to claim 22 comprising means for generating synchronized vertical sync signals, horizontal sync signals and sample point clock signals, and wherein said means for selecting predetermined fields of said plurality of fields includes a counter responsive to said vertical sync signals and adjustable decoding means responsive to the output of said counter.

25. Apparatus according to claim 24 wherein said means for selecting predetermined scanning lines comprises a counter responsive to said horizontal sync signals and adjustable decoding means coupled to said counter.

26. Apparatus according to claim 25 wherein said means for selecting predetermined scanning points comprises a counter responsive to said sample point clock signal and adjustable decoding means coupled to the output of said counter.

\* \* \* \* \*